UNITED STATES PATENT OFFICE.

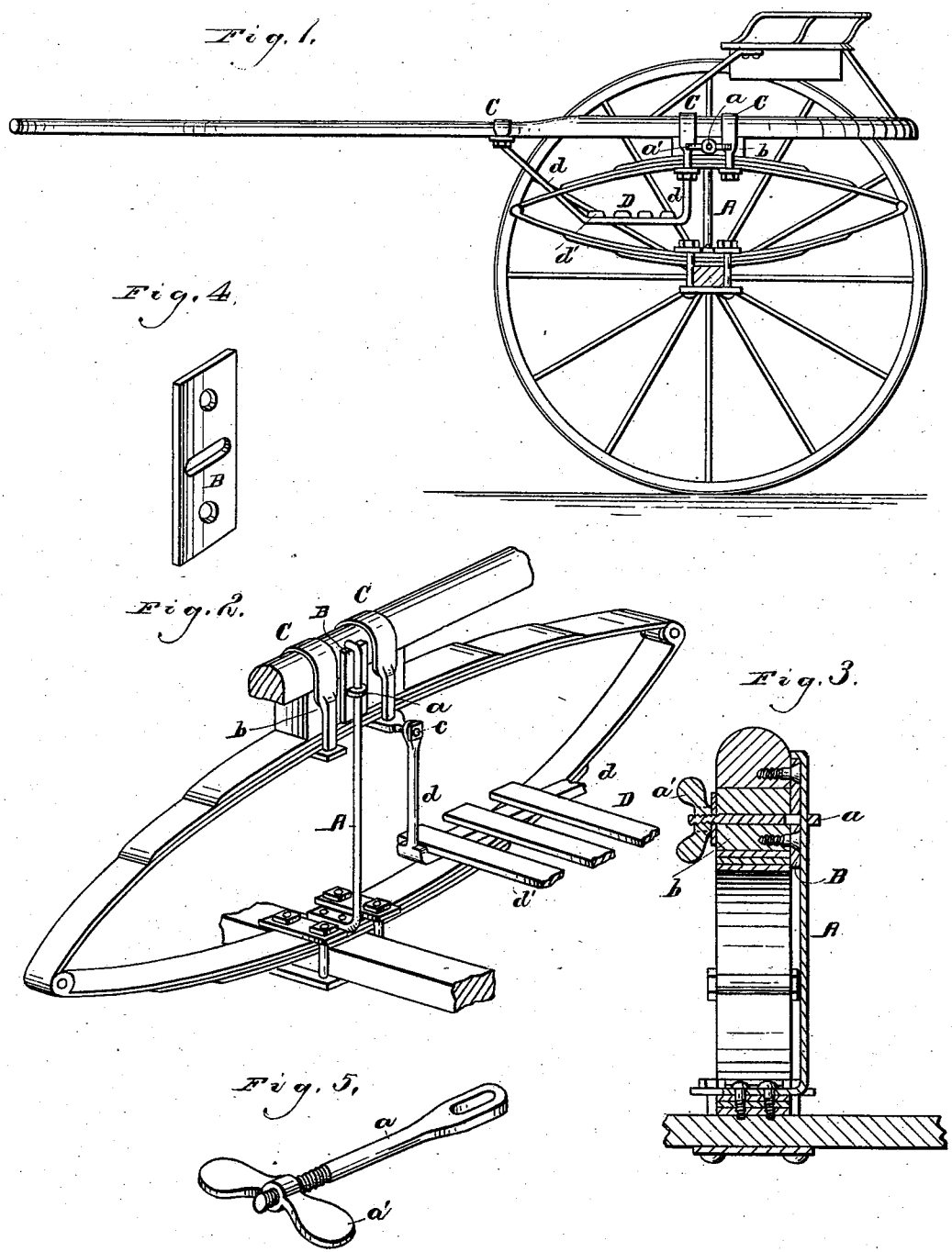

CASPER W. WATSON, OF WHEATON, ILLINOIS.

ROAD-CART.

SPECIFICATION forming part of Letters Patent No. 260,434, dated July 4, 1882.

Application filed April 20, 1882. (No model.)

*To all whom it may concern:*

Be it known that I, CASPER W. WATSON, of Wheaton, Du Page county, Illinois, have invented a new and useful Improvement in Road-Carts, of which the following is a specification.

The object of my invention is to provide a road-cart which can be easily and expeditiously transformed into a track-sulky whenever desired, in the former the use of the ordinary carriage-springs being desirable, while in the latter the bed of the vehicle should be rigidly supported upon the axle. This is accomplished by means of peculiar locking devices attached to the springs of the road-cart.

In the drawings, Figure 1 represents a side elevation of the road-cart with one wheel and a portion of the axle removed. Fig. 2 is a perspective view of the spring with its locking and other attachments. Fig. 3 is a transverse section of the spring and attachments, taken in the center of the spring. Fig. 4 represents the slotted plate through which the eyebolt passes, and Fig. 5 is the eyebolt.

Like letters indicate like parts in the different figures.

The drawings represent a road-cart or sulky of ordinary construction, the bed of which is mounted upon elliptical springs, which in turn are supported upon the axle of the vehicle. The bed of the cart is secured to the springs by means of clips, which encircle the shafts and springs, the block *b* being interposed between them.

A is a vertical rod, the lower portion of which is bent at right angles and perforated, and through the perforations is secured firmly by the spring-bolts to the top of the lower half of the spring, and extends upward on the inner side of the spring above the top thereof, passing through the eye of the bolt *a*.

B is a plate secured by screws to the inner side of the block *b* and shaft, and having an oblong slot or opening, through which passes the head of the eyebolt *a*. The eyebolt *a* passes loosely through the block *b* and the slot in the plate B, and is secured therein by a thumb-nut, *a'*, on the outer side of the block.

At the upper end of the rod A is formed a flange or stop, against which the upper edge of the plate B strikes when the spring expands beyond the proper point. As the spring vibrates the eye of the bolt *a* passes up and down the rod A, the spring acting with entire freedom. When it is desired to lock the spring the thumb-nuts are turned up, drawing the eyebolt through the plate B and binding the rod against the plate, where it is thus rigidly and securely fastened, whereby the rigidity of the spring is secured and its action prevented. In this position the cart may be used as a track-sulky for the purpose of training horses upon the course, or put to any other use where the action of the springs is not desired.

The springs may be locked while the operator is sitting in the cart, and the change is thus effected instantly and with little trouble, while the springs are locked at the exact point of compression to which they are brought by the weight of the person occupying the cart, and thus the locking device is subjected to the least possible strain; also, the springs may be locked at any point between the extremes of expansion and compression.

D is a detachable foot-rest, consisting of the hangers *d d*, to which are secured the cross-pieces *d'*. The foot-rest is suspended from the shafts by means of the hangers. In each extremity of the hangers is an eye, by means of which the hangers are secured to the clips C C. The cross-heads of the clips are prolonged toward the inner side of the shafts, and threaded, as shown at *c*. The threaded ends of the cross-heads are inserted in the eyes in the extremities of the hangers, which are secured thereon by nuts. By removing these nuts—four in number—the foot-rest may be detached from the cart, as is sometimes desirable when the cart is to be used as a track-sulky. While the connection with the clips may be made by having the eyes in the cross-heads and the extremities of the hangers inserted therein, the method described is preferable.

Having described my invention, what I claim as new, and desire to secure by Letters Patent, is—

1. In a road-cart, the detachable foot-rest D, consisting of the hangers *d* and cross-bars $d'$, in combination with the clips C C, secured upon the shafts of the cart, substantially as described.

2. The rod A and the eyebolt $a$, provided with means for securing its combination with a vehicle-spring, substantially as described.

3. The combination of the rod A, eyebolt $a$, provided with the thumb-nut $a'$, and the slotted plate B with a vehicle-spring, substantially as and for the purposes described.

CASPER W. WATSON.

Witnesses:
PLINY B. SMITH,
EZRA G. VALENTINE.